April 19, 1932. H. F. DUGDILL ET AL 1,854,890
TUBULAR SWIVEL CONNECTION FOR ELECTRIC LIGHT AND SIMILAR FITTINGS
Filed April 17, 1930
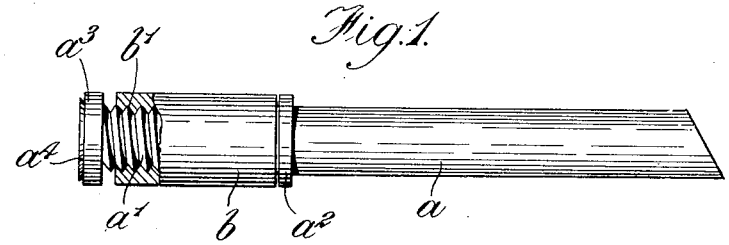
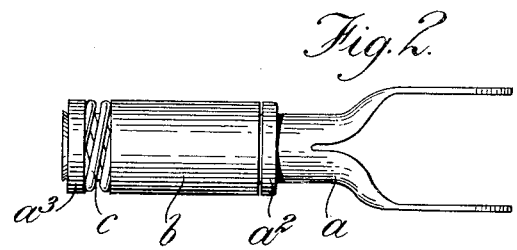
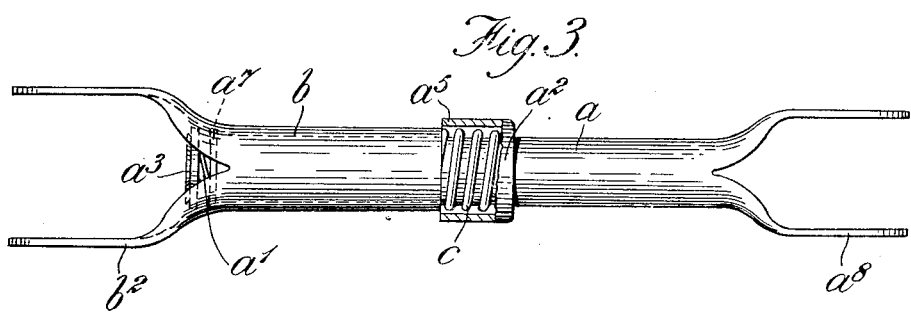
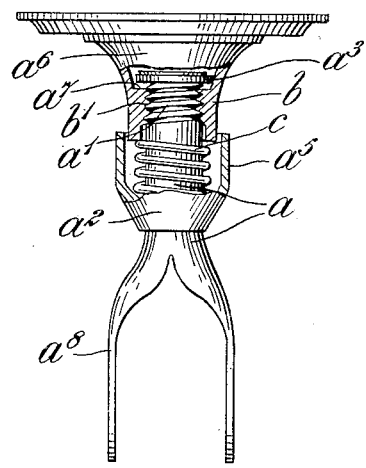
INVENTORS
H. F. Dugdill and
D. Dugdill
BY
Siggers & Adams
ATTORNEYS Patented Apr. 19, 1932

1,854,890

UNITED STATES PATENT OFFICE

HAROLD FREMANTLE DUGDILL AND DORA DUGDILL, OF NORBURY STOCKPORT, ENGLAND

TUBULAR SWIVEL CONNECTION FOR ELECTRIC LIGHT AND SIMILAR FITTINGS

Application filed April 17, 1930, Serial No. 445,095, and in Great Britain April 25, 1929.

This invention relates to tubular swivel connections for electric light and similar fittings, and while of general application, is of especial utility in connection with articulated fittings.

The present invention has for its principal object to provide an improved, simple and effective construction of swivel connection whereby the amount of relative rotation of the respective parts of the connection may be limited, this being necessary, for example, in the case of fittings carrying insulated electric wires to prevent damage to the insulation and eventual breakage of the wire which would be liable to occur if the fittings were capable of unlimited relative rotation in one direction or the other. A further object of the invention is to provide improved means for introducing smooth friction between the parts so that, while capable of being freely moved relatively to one another by hand, they maintain the relative positions to which they are set without the necessity of providing additional clamping or fixing means.

According to the present invention, the improved swivel connection comprises interengaging screw-threaded tubular parts, the extent of relative axial movement of which in either direction when rotated with respect to one another being limited by the engagement of abutments, collars or the equivalent on the respective parts, and such abutments or the equivalent being spaced apart at a suitable distance to provide clearance between the co-operating abutments according to the amount of relative rotary or angular movement between the parts that is required.

Furthermore, according to the invention, in order to introduce smooth friction between the respective parts, a spring or springs is or are provided whereby one part of the connection is subject constantly to axial pressure in one direction with respect to the other part. By such means the co-operating screw-threads may be caused to engage one another with sufficient axial pressure to provide the requisite friction which, while effective to maintain the parts in the respective positions to which they are set, is always smooth in operation.

The invention is hereinafter described by way of example with reference to the accompanying diagrammatic drawings in which:—

Figure 1 is a part sectional elevation illustrating a simple construction of tubular swivel connection or mounting according to the invention;

Figures 2 and 3 are views in elevation illustrating modifications; and

Figure 4 is a part sectional elevation illustrating a further modification.

In carrying the invention into effect and with reference to the accompanying diagrammatic drawings, the improved swivel connection consists of two tubular members $a$, $b$, one member $a$ having an externally screw-threaded portion $a'$ co-operating with an internally screw-threaded portion $b'$ on the other member $b$. The projecting part of the inner member $a$ is provided with a flange, collar or the like $a^2$ which may be screwed upon the threaded portion $a'$ of the member $a$ and fixedly held in position as by screwing it down hard to the end of the screw-threaded portion. The other end of the inner member $a$ is similarly provided with a flange, collar or the equivalent $a^3$ which, similarly, may be screwed upon the threaded portion $a'$ and may be retained thereon by burring over the respective end of the inner member $a$ as at $a^4$. The respective flanges, collars or the like $a^2$, $a^3$ are set apart at such a distance that there is a small amount of clearance between them and the ends of the screw-threaded portion of the outer member, such clearance permitting the members $a$, $b$ to be rotated with respect to one another to a limited extent which is determined by the engagement of the ends of the threaded portion of the outer member $b$ with the respective flange, collar or the equivalent $a^2$ or $a^3$, it being understood that as the members $a$, $b$ are screwed with respect to one another in one direction or the other, relative axial movement of the members takes place.

In order to provide the requisite amount of friction between the respective members $a$, $b$ for the purpose before referred to, the flanges, collars or the equivalent $a^2$, $a^3$ may be set apart at a sufficient distance to permit the interposition of a short helical spring between one of the flanges, collars or the equivalent and the respective end of abutment of the outer tubular member. Thus, the spring $c$ may be interposed (as shown in Figure 3) between the end of the outer tubular member $b$, which overlaps the inner tubular member $a$, and the adjacent flange or the equivalent $a^2$ upon the inner member $a$, or may be interposed (as shown in Figure 2) between the flange $a^3$ at the extremity of the inner member $a$ and the adjacent end or flanged part or other suitable abutment of the outer tubular member $b$. Where such a spring $c$ is provided, the respective flange, collar or the equivalent, such as $a^2$, upon the inner member $a$, or if desired, the outer member itself, may be flanged or otherwise formed to provide a housing $a^5$ by which the spring $c$ may be hidden from view.

The outer member $b$ may be flanged or enlarged so as to project over the flange, washer or the equivalent at the end of the inner member, or may be otherwise formed, as shown in Figure 4, so as to constitute or be attached to a ceiling or other bracket or fitting $a^6$ as desired.

The swivel connection herein described is particularly applicable to tubular members having forked ends, in which case the swivel connection is conveniently provided adjacent the forked end $b^2$ (Figure 3) of the outer member $b$, such fork $b^2$ being formed, for example, by slitting the tubular outer member $b$ longitudinally and expanding the divided end portions. The enlargement of the outer member $b$ consequent on the formation of the fork $b^2$ enables it to extend freely over the flange, collar or the like $a^3$ at the extremity of the inner member $a$ and at the same time provides an abutment $a^7$ with which the said flange, collar or the like $a^3$ co-operates in one direction of relative movement of the members $a$, $b$. The inner member $a$ similarly may be formed with a forked end $a^8$ (as shown in Figures 3 and 4) or may be fixed to or constitute part of a ceiling, wall or other fixed bracket or base member. Alternatively, (as shown in Figure 4) such fixed bracket or base member $a^6$ may comprise or incorporate the outer tubular member $b$, the inner member $a$ being provided with a forked end $a^8$ as before described.

It will be readily appreciated that by the invention, a very neat swivel connection is provided, such connection being smooth in operation and ensuring the necessary limitation in the relative rotation of the parts without the necessity of providing pin and slot or equivalent limiting devices which, while being less robust in construction, are more difficult or expensive to manufacture.

It will be understood that the invention is not limited to the particular details of construction hereinbefore described. For example, the invention is applicable to tubular fittings of all kinds and for various purposes where a swivel connection is required and, particularly in the case where springs are provided, may be utilized in connection with pipe lines or fittings conveying gas or fluids, it being understood that the engagement of the screw-threads under the action of the spring will be sufficient to ensure a gas or fluid-tight joint under ordinary conditions. Furthermore, instead of providing flanges, collars or the equivalent or enlargements upon the inner member to act as stops, the screw-threaded portion of the inner member may be of enlarged diameter and the outer member may be provided with a portion of enlarged diameter screw-threaded internally to engage with the screw-threaded portion of the inner member, the stop in one direction being provided by the engagement of the end of the inner member with the reduced portion of the outer member and, in the other direction, by the engagement of an inwardly directed flange or otherwise reduced portion at the end of the outer member with the adjacent end of the enlarged screw-threaded portion of the inner member. Any other suitable construction of the interengaging screw-threaded parts and the co-operating abutments or stops may be utilized, while the spring before referred to may be otherwise arranged in connection with the members to produce axial pressure of one member with respect to the other.

What we claim is:—

1. A swivel connection for electric light and similar fittings comprising, in combination, a generally tubular member having external screw threads for a portion of its length; another member which is hollow from end to end and which has internal screw threads engaging the external screw threads on the tubular member; the tubular member providing a continuous internal passageway through which electric light wires may pass; a screw threaded abutment adjustably secured to the tubular member and projecting from the exterior thereof; another abutment mounted on the exterior of the tubular member and spaced from the first named abutment a distance greater than the length of the hollow member, so that the hollow member may be turned relative to the tubular member until it contacts with either abutment.

2. The combination claimed in claim 1, wherein a coil spring is mounted on the tubular member and bears at one end against one of the abutments and at the other end against the hollow member, to exert a constant pressure to provide the proper amount of friction between the two members.

3. The combination claimed in claim 1, wherein a coil spring is mounted on the tubular member and bears at one end against one of the abutments and at the other end against the hollow member, to exert a constant pressure to provide the proper amount of friction between the two members, and wherein an annular housing is provided to enclose the spring.

4. The combination claimed in claim 1, wherein a coil spring is mounted on the tubular member and bears at one end against one of the abutments and at the other end against the hollow member, to exert a constant pressure to provide the proper amount of friction between the two members, and wherein an annular housing is provided to enclose the spring, said housing being integral with the abutment against which the spring bears and extending substantially to the hollow member.

5. The combination claimed in claim 1 wherein each abutment is formed by a screw-threaded ring engaging the threads on the tubular member and screwed down hard at the opposite ends of the threaded portion thereof so as to be substantially immovable.

6. The combination claimed in claim 1 wherein the hollow member is split and outwardly flared at one end, and entirely encloses one of the abutments and has its screw threads terminating short of the other end.

7. The combination claimed in claim 1 wherein the hollow member is outwardly flared at one end, and entirely encloses one of the abutments and has its screw threads terminating short of the other end, a coil spring being mounted on the tubular member bearing against said other end of the hollow member and against the other abutment.

8. The combination claimed in claim 1 wherein the hollow member is outwardly flared at one end, and entirely encloses one of the abutments and has its screw threads terminating short of the other end, a coil spring being mounted on the tubular member bearing against said other end of the hollow member and against the other abutment, and a housing for the spring being integral with said other abutment and extending over the aforesaid other end of the hollow member so as completely to enclose the spring and to hide the joint between the two members.

HAROLD FREMANTLE DUGDILL.
DORA DUGDILL.